Feb. 15, 1949.    D. G. TAYLOR    2,461,615
FLUID CONTROL DEVICE
Filed Sept. 25, 1943
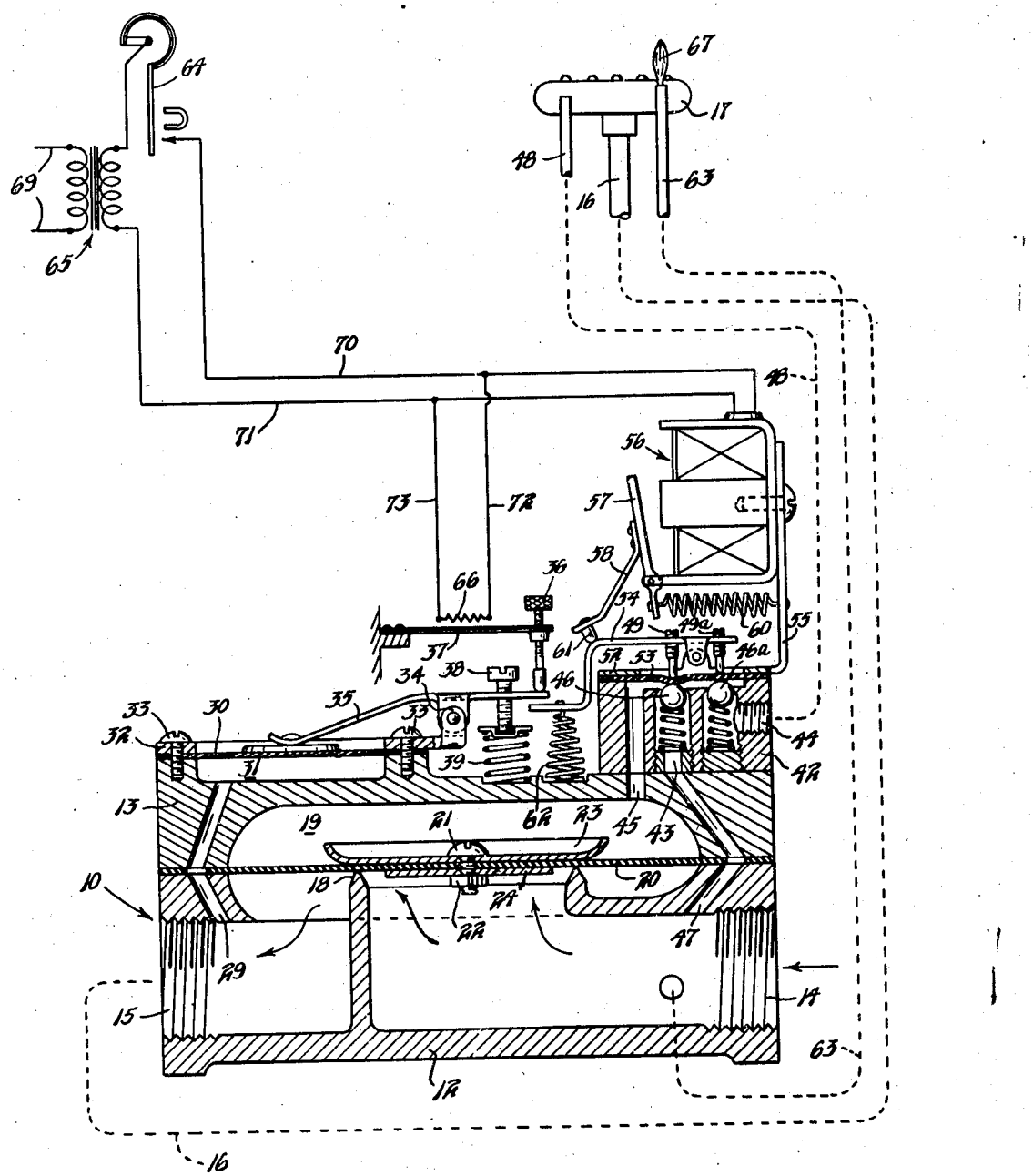
Inventor
DANIEL G. TAYLOR
By
George N. Fisher
Attorney Patented Feb. 15, 1949

2,461,615

UNITED STATES PATENT OFFICE 2,461,615

FLUID CONTROL DEVICE

Daniel G. Taylor, Minneapolis, Minn., assignor to Minneapolis-Honeywell Regulator Company, Minneapolis, Minn., a corporation of Delaware Application September 25, 1943, Serial No. 503,771

23 Claims. (Cl. 137—139)

This invention relates to an improved fluid control apparatus which is especially adapted to be used in conjunction with the control of the flow of gas through a supply line. However, it will be apparent that use of the improved fluid control apparatus of this invention is by no means confined to such a limited field.

One of the principal objects of the improved device of this invention resides in the provision of means resulting in a quiet operating, step opening valve in which a relatively rapid initial step establishes an adjusted minimum flow and a second step which gradually increases the flow to a predetermined maximum and then modulates the flow to variable norm thereafter.

It is to be noted that all controlled elements and means such as heat responsive, electromagnetic, pressure responsive, and the like, and adjustments operate on or through the pilot valve means. All valve action for controlling and governing the flow of fluid through the improved device is controlled by the pilot valve means. Because control devices much smaller and lighter in weight may be employed for operating the pilot valve mechanism than the main valve and diaphragm, a considerable savings in material and machining is effected. Additionally, the lighter parts tend to give longer service. Thus, the improved device of this invention is exceptionally economical from both a manufacturing and a maintenance standpoint.

A further object of advantage and importance is the provision of means for locking the pilot valve member in a normal position wherein open communication between the inlet and the chamber above the diaphragm valve equalizes the pressure to maintain the main valve in normally closed position.

Still another object of advantage resides in the provision of adjustable means for controlling the flow in ratio to a selected pressure in the outlet portion of the device. A regulator diaphragm in association with the pressure chamber functions to operate the pilot valve which in turn positions the main valve in accordance with pressure requirements. Still another object of the invention resides in the provision of electromagnetic means for releasing the pilot valve member to function to control the opening and positioning of the diaphragm valve in response to other control means requirements. Until the electromagnetic member is energized the pilot valve member is maintained in normal position. During its period of energization the electromagnetic means does not enter into the control of the device.

A still further object of advantage and importance of the improved device of this invention is the provision of heat responsive means in cooperation with pressure responsive means for operating the pilot valve to control the speed of the main valve after the initial opening. This heat responsive control is effective only until the main valve reaches a full flow position. Thereafter control of the flow passes to the regulator diaphragm mechanism.

An additional object of importance resides in the provision of spring loaded electromagnetic responsive means which upon deenergization of the electromagnet function to operate the pilot valve resulting in the rapid closing of the main valve. The electromagnetic responsive means operates the pilot valve for closing the main valve and also operates to release the pilot valve that it may function to cause the opening of the main valve.

Additional objects of advantage and importance will become apparent as the following detailed description progresses, reference being had to the accompanying drawing wherein The figure is a schematic showing, partly in section, of a flow control apparatus which embodies the invention.

The reference numeral 10 indicates generally a valve housing which in the preferred embodiment of the invention comprises, a lower portion 12 and an upper portion 13. The lower portion 12 is provided with an inlet 14 and an outlet 15. The inlet 14 is connected with a source of supply (not shown) and the outlet is connected by a conduit 16 with a burner 17. An annular valve seat 18 is located intermediate the inlet 14 and the outlet 15. Fluid entering the inlet 14 may pass through the annular valve seat 18 into the outlet 15, substantially as indicated by the arrows. The upper portion 13 of the housing 10 is preferably recessed to form a pressure chamber 19. The pressure chamber 19 is preferably located centrally of the upper portion 13, as is clearly shown in the drawing, and may be of any suitable form. Interposed between the upper and lower portion of the housing 10 is a diaphragm 20. The diaphragm 20 defines the lower boundary of the pressure chamber 19. Secured to opposed surfaces of the diaphragm 20 by means of a screw and nut 21 and 22, respectively, are upper and lower reinforcing members 23 and 24, respectively. The reinforcing members are positioned in concentric relation with the diaphragm and with each other and are in alignment with the valve seat 18. The reinforcing member 23 and 24 function to maintain the diaphragm in parallel relation with the upper surface with the valve seat 18. The reinforcing members which are also counterweights assist in maintaining a fluid-tight relation between the bottom surface of the diaphragm and the upper edge of the valve seat 18 when the two parts are in engagement thus providing a main valve for the device. A recessed portion of the upper member 13 is provided with a diaphragm 30, as is clearly shown in the drawing, to provide a pressure regulating chamber 31. The pressure regulating chamber is in open communication with the outlet 15 by way of a passageway 29. The diaphragm 30 is preferably secured in position by means of a ring 32 and a plurality of screws 33. Rotatably secured at its intermediate portion to a yoke 34 projecting upwardly from the ring 32 is a regulator operating lever or arm 35. One end of the arm 35 is attached to the regulator diaphragm 30, by any suitable means, and the other end thereof engages an adjustment screw 36 of a heat responsive bimetal element 37 providing an adjustable stop for a pilot valve operating member. A pressure regulating adjustment unit comprising a screw 38 and an expansion spring 39 preferably mounted in the manner shown, provides a means for increasing or decreasing the anti-clockwise urge of the arm 35 against the end of the adjustment screw 36. The adjustment of the member 38 likewise increases or decreases the clockwise urge of the inherently resilient bimetal member 37. The adjustment screw 38 and its associated spring 39 function to demand increased or decreased pressure in the chamber 31 to balance the operating arm 35. Thus the device may be operated at a selected pressure norm.

Positioned on the upper portion 13 of the housing 10 is a three-way pilot valve member 42. The pilot valve member 42 is provided with an inlet port 43, an outlet port 44 and a passage 45. The passage 45 connects the ports 43 and 44 with the pressure chamber 19. The inlet port 43 is provided with a spring loaded spherical valve 46 and the outlet port 44 is provided with a similiar valve 46a, although it will be apparent other suitable types of valves may be employed. A passageway 47 extending upwardly through both portions of the housing 10 connects the inlet 14 with the inlet port 43. The passageway 47 provides a means whereby fluid may be conveyed from the supply into the inlet port 43 from whence, when the valve 46 is opened, it may pass through the passage 45 into the pressure chamber 19. The passage 45 also provides a means for bleeding the pressure chamber 19 through the outlet port 44 when the inlet valve 46 is closed and the outlet valve 46a is opened. A conduit 48 connected to the outlet port 44 conveys the waste gas to the burner 17 where it is consumed.

Secured to the upper surface of the pilot valve member 42 by means of an apertured member 52 is a sealing diaphragm 53. The sealing diaphragm 53 provides a fluid-tight movable wall between the valves 46 and 46a, and their adjustable contacting members. Rockably secured to an apertured portion of the apertured member 52 is an off-set pilot valve operating member 54. A portion of the pilot valve operating member 54 parallels the top surface of the pilot valve member and then extends downwardly and then horizontally to terminate at a point slightly overlapping and beneath the end of the arm 35, as is clearly shown in the drawing. Adjustable contacting members 49 and 49a, in screw threaded association with the member 54 provide a means for depressing the valves 46 and 46a when the member 54 is rotated or rocked.

Extending upwardly from the pilot valve member 42 is a supporting bracket 55 to which an electromagnetic member 56 is secured. Hingedly secured to the member 56 is an electromagnetic responsive element 57. The element 57 is provided with a downwardly and outwardly projecting arm 58. When the electromagnetic member is deenergized a spring member 60 acting upon the element 57 positions it as shown in the drawing with the arm 58 or a contacting member 61 engaging the off-set member 54. The spring actuated element 57 and its associated parts thus combine to form a lock preventing any upward movement of the pilot valve operating member 54. It is to be noted that when the operating arm 54 is in locked position the inlet port valve 46 is opened, consequently pressure in the pressure chamber 19 and the inlet 14 are equal and the main valve formed by the diaphragm 20 is in closed position. An expansion spring 62 exerts an upward pressure against the off-set portion of the member 54. Thus, when the element 57 is in an attracted or unlocked position the end of the member 54 is forced upwardly into engagement with the arm 35 against which it is biased and the valve 46 of the inlet port 43 is closed.

Extending from a point ahead of the main valve preferably from the inlet 14 to a point adjacent the burner 17 is a conduit 63 which supplies a pilot light 67. A portion of the conduit 63 is shown in dotted line.

As shown in the drawing, the improved device of this invention is adapted to be operated in conjunction with a room thermostat 64. The thermostat 64 is electrically connected with a transformer 65, which in turn is connected by conductors 70, 71, 72 and 73 with the electromagnetic member 56 and a heating element 66 for the bimetallic member 37. The transformer 65 is supplied through a line circuit 69.

*Operation*

Upon a call for heat the thermostat 64 functions to establish a circuit from the transformer 65 through the thermostat 64 and the lead wire 70 to the electromagnetic member 56 thence returning through the lead wire 71 to the transformer 65. Concurrently, therewith, a circuit is also established through the lead wire 72, the heating element 66, returning through the lead 73 to the lead 71 and thence to the transformer 65. Upon energization of the electromagnetic device 56 the element 57 is drawn into attracted position, releasing the off-set member 54. The off-set end of the member 54 is moved in clockwise direction by expansion of the spring 62. This movement is arrested when the off-set member engages the overlapping end of the arm 35. At this time the member 35 is balanced between the upward urge of the springs 39 and 62 and the resistance of the yieldable bimetal member 37. The rotative movement of the member 54 closes the inlet port valve 46 and opens the outlet port valve 46a. This valve movement permits fluid in the chamber 19 to be bled off thus reducing the pressure therein. As the pressure in the chamber 19 decreases the pressure in the inlet forces the diaphragm 20 upwardly away from the valve seat 18. A portion of the gas or fluid flowing from the inlet 14 into the outlet 15 is diverted through the passage 29 into the pressure regulator chamber 31. As the pressure in the chamber 31 builds up, the opposing forces, as represented by the springs 39 and 62 on one side and the member 37 on the other side, are unbalanced and the diaphragm 30 is raised moving the arm 35 in a clockwise direction. This movement is transmitted to the pilot valve operating member 54 and results in an anti-clockwise movement of that member. The anti-clockwise movement of the member 54 closes the outlet port valve 46a thus arresting further upward movement of the diaphragm 20. A minimum flow has now been established. It is to be noted that at this period of operation the springs 39 and 62 oppose the member 37 and the pressure in the chamber 31 to maintain the valves 46 and 46a in closed position. Concurrently, with the above action, the heating element 66 has been in operation. The heat generated by the element 66 is transmitted to the bimetallic member 37 causing that member to warp upwardly. The upward movement of the bimetallic member eliminates a portion of the force resisting expansion of the springs 39 and 62 and leaves only the pressure in the chamber 31 resisting such expansion. As a consequence, the diaphragm 30 is depressed and the overlapping ends move upwardly thus moving the operating member 54 in a clockwise direction to reopen the outlet port valve 46a. As a result of the second opening of the outlet port valve, pressure in the chamber 19 is further reduced and the diaphragm valve moves to full open position. The second movement of the diaphragm valve is in direct ratio to the movement of the bimetallic element 37. When the valve reaches a selected full open position, control of the flow therethrough passes to the regulator diaphragm and its associated parts. Further upward movement of the bimetallic element 37 does not effect or have a bearing on the further control of flow. Because the pressure chamber 31 is in open communication with the outlet 15, pressures therein are equalized. This pressure is reflected in the position of the regulator diaphragm 30. The diaphragm through its associated parts and linkage connection with the pilot valve 42 thus controls the positioning of the main diaphragm valve 20 through regulation of the pressure within the chamber 19 thus controlling flow through the device. For instance, if the main diaphragm valve 20 is opened too wide the pressure within the outlet 15 and the chamber 31 forces the pressure diaphragm 30 upwardly. This expansion of the diaphragm overpowers the spring 62 and the adjustment spring 39 and moves the arm 35 in a clockwise direction which is transmitted in anti-clockwise movement to the member 54. The anti-clockwise movement of member 54 closes the outlet port valve 46a and opens the inlet port valve 46 admitting fluid from the inlet 14 through the passageway 47 into the upper chamber 19. The added fluid increases the pressure in the chamber 19 sufficiently to move the diaphragm to a lower level thus closing or diminishing the opening between the valve seat 18 and the underside of the diaphragm 20. This action results in a curtailed flow of fluid through the device.

Upon satisfaction, the thermostat 64 opens the circuit deenergizing the electromagnetic member 56 and the heating element 66. Upon deenergization of the electromagnetic member, the spring 60 functions to promptly bring the contacting member 61 into engagement with the member 54. This move overcomes the tension of the spring 62 to move the member 54 in an anti-clockwise direction closing the outlet port valve 46a and opening the inlet port valve 46. Fluid from the inlet 14 is directed into the chamber 19 where it builds up sufficient pressure to quickly close the diaphragm valve 20. As the bimetallic element cools and moves into normal position the adjustment screw thereon again engages the lever 35 as a stop. Concurrently with this action, fluid from the pressure chamber 31 and the outlet 15 escapes; thus the cycle of operation is completed.

It will be apparent from the foregoing that herein is provided an improved device wherein an electromagnetic member is employed to release a lock preparatory to opening the main control valve. Furthermore, the valve is opened in a plurality of steps, the first of which is a relatively rapid limited opening permitting an adjusted minimum flow and the second step is a relatively slow step progressively moving the valve to an adjusted full flow position. The improved device also automatically controls the flow to a selected rate which may be varied.

It will also be apparent to those skilled in the art to which the improved device of this invention appertains that numerous changes in construction and design may be made without departing from the spirit or scope of the invention. Accordingly, the patent granted hereon is not to be limited to the precise construction here disclosed or in any other manner except as may be necessitated by the terminology of the appended claims when given the range of equivalents to which they may be entitled.

I claim as my invention:

1. In a flow control device, a main valve, a pressure responsive device for operating said main valve, pilot valve means for controlling the pressure in said pressure responsive device to open said main valve in a plurality of steps, means biasing said pilot valve towards a position in which main valve opening pressure is applied to said pressure responsive device, electromagnetic responsive means when in unattracted position maintaining said pilot valve inactive whereby main valve closing pressure is supplied to said pressure responsive device, and heat and pressure responsive means operable in conjunction for limiting the action of said pilot valve biasing means to effect initial opening of said main valve when said electromagnetic means is attracted, said heat and pressure responsive means controlling the further opening movement of said main valve.

2. In a flow control device, a main valve, a pressure responsive device for operating said main valve, pilot valve means for controlling the pressure in said pressure responsive device to open said main valve in a plurality of steps, means biasing said pilot valve toward a position in which main valve opening pressure is applied to said pressure responsive device, spring loaded electromagnetic responsive means, said last named means when in unattracted position providing means for maintaining said pilot valve inactive and in a position in which valve closing pressure is applied to said pressure responsive device, and heat and pressure responsive means operable in conjunction for limiting the action of said pilot valve biasing means to effect initial opening of said main valve when said electromagnetic means is attracted, said heat and pressure responsive means controlling the further opening movement of said main valve.

3. In a flow control device comprising in combination, a valve housing having an inlet and an outlet, a diaphragm actuated valve positioned intermediate said inlet and said outlet, pilot valve means for controlling the opening of said diaphragm actuated valve in a plurality of steps, said pilot valve means including valved inlet and outlet passages, means for biasing said pilot valve means to a position wherein the inlet is closed and the outlet is open to effect initial opening of the diaphragm actuated valve, means for locking said pilot valve means in a normal position against the action of said biasing means wherein the inlet passage is open and the outlet passage is closed, electromagnetic means for releasing said locking means, pressure and heat responsive means operable in conjunction for limiting the action of said pilot valve biasing means to effect initial opening of said main valve when said electromagnetic means is attracted, said heat and pressure responsive means actuating said pilot valve means for controlling the further opening of said diaphragm actuated valve, and said pilot valve means being positioned to close said diaphragm actuated valve upon deenergization of said electromagnetic means.

4. In a flow control apparatus, a main valve, means biased to open said main valve in a plurality of steps, means including a two position element which when in one position functions to maintain said first means in inactive position against its bias to close the main valve and when in its other position renders the bias capable of positioning said first means to function to effect opening of the main valve, abutment means operable to terminate the initial step of the opening movement of said main valve, means for moving said abutment means from its initial step terminating position, and means operable in conjunction with said element for returning said element to said one position.

5. In a flow control apparatus, a main valve, means biased to open said main valve in a plurality of steps, means including a movable element which when in one position functions to maintain said first means in inactive position against its bias to close the main valve and when in another position renders the bias capable of positioning said first means to function to effect opening of said main valve, abutment means operable to terminate the initial step of the opening movement of said main valve, heat responsive means for moving said abutment means from its initial step terminating position, and pressure responsive means operable in conjunction with said first means for controlling the flow of fluid through said apparatus.

6. In a flow control apparatus, a main valve, means biased to open said main valve in a plurality of steps, means including an electromagnetic responsive element which when in one position functions to maintain said first means in inactive position to close the main valve and when in another position renders the bias capable of positioning said first means to function to effect opening of said main valve, means operating concurrently with the movement of the electromagnetic responsive element to active position and operable in conjunction with said first means to position said first means to induce relatively rapid initial opening of said main valve, and heat responsive means operable to limit initial opening movement to an intermediate position and to retard the rate of the further opening movement of said main valve.

7. In a flow control apparatus, a main valve, control means biased toward a position which permits said main valve to open, means including an electromagnetic responsive element which when in one position functions to maintain said control means in inactive position to close the main valve and when in another position renders the bias capable of positioning said control means to effect opening of said main valve, means positioned to be engaged by said control means only upon movement of the electromagnetic responsive element to active position and operable in conjunction with said control means to position said main valve in accordance with the outlet pressure of said main valve.

8. In a flow control apparatus, a main valve, means biased to open said main valve in a plurality of steps, said means including an electromagnetic responsive element which when in one position functions to maintain said means in inactive position against its bias to close the main valve and when in another position renders the bias capable of positioning said means to function to effect opening of the main valve, means operating with the movement of the electromagnetic responsive element to active position and operable in conjunction with said first means to position said first means to induce relatively rapid initial opening of said main valve to heat responsive means to limit initial opening movement to a minimum flow position and thereafter yieldably resisting further movement of said main valve opening means, and adjustable pressure responsive means operable in conjunction with said first means and said heat responsive means for controlling the flow of fluid through said apparatus.

9. In a flow control device, a main valve, pressure responsive means for positioning said main valve, pilot valve means for controlling the operation of said pressure responsive means biased to open said main valve, spring loaded means for maintaining said pilot valve in normal main valve closed position, means for rendering ineffective said spring loaded means whereby said pilot valve means opens said main valve, abutment means operable to terminate movement of said main valve at a minimum flow position, means for altering the position of said abutment means to remove its terminating action to permit the further opening of said main valve, means for positioning said main valve to govern the flow in relation to pressure in the outlet portion of the device, said main valve closing in a single continuous movement when said spring loaded means is rendered effective.

10. In a flow control device, a main valve, pressure responsive means for positioning said main valve, control means for actuating said pressure responsive means, a first means for operating said control means to move said main valve to a predetermined partly open position, a second means responsive to pressure in the outlet portion of said device for operating said control means to move said main valve to a predetermined substantially fully open position, heat responsive means yieldably resisting said last named movement, and adjustable means for regulating the flow in ratio to the pressure in the outlet portion of said device.

11. In a flow control apparatus, a valve housing having an inlet and an outlet, a main valve positioned intermediate said inlet and said outlet, pressure responsive means for positioning said main valve, pilot valve means, a first control means operating said pilot valve means to move said main valve from closed to open position, adjustable abutment means for selectively controlling the extent of initial opening, an electromagnetic responsive element engagable with and providing a lock for said first control means to hold it in a position so as to maintain the pilot valve in main valve closing position when said element is in one position, said electromagnetic responsive element being removed from engagement with said first control means when in another position, a second control means operable in conjunction with said abutment means and said first control means for operating said pilot valve means to move said main valve from a partly open to a substantially full open position, and pressure responsive means functioning jointly with said second control means for controlling the positioning of said main valve to govern the flow of fluid through said device in relation to the pressure in said outlet.

12. In a flow control device, a main valve movable into minimum and full flow position, a pressure responsive device for positioning said main valve, pilot valve means for controlling said pressure responsive device, operating means positioning said pilot valve means, means urging said operating means in a direction for main valve opening movement, movable stop means obstructing the movement of said operating means in said direction, means for removing said movable stop, a second stop means limiting movement of said operating means to bring said main valve into minimum flow position, heat responsive means arranged to cause said second stop means to yieldably resist said urging means until said main valve has reached a predetermined full flow position, and pressure responsive means operable in conjunction with the heat responsive means and said operating means for controlling said pilot operating means to position said main valve in relation to the value of the pressure in the outlet portion of the device.

13. In a flow control apparatus, a main valve, pressure responsive means for positioning said main valve, control means biased to operate said pressure responsive means to main valve open position, means for locking said control means in normal main valve closed position, means for releasing said locking means, abutment means disposed to curtail the operative opening movement of said control means, and means operable in conjunction with said lock releasing means for closing said main valve and restoring said control means to locked position.

14. In a flow control apparatus, pilot valve means causing said apparatus to open to a minimum flow position in a relatively quick movement and to further open said apparatus to a selected full flow position in a relatively slow movement, pressure actuated abutment means for terminating said relatively quick movement, means for altering the position of said abutment means to remove its terminating action to permit said relatively slow movement, means operable through said pilot valve for modulating the flow after the movement of said abutment means, and means for varying the pressure norm under which said pilot valve means modulates said flow.

15. In a flow control device, a main valve, pilot valve means controlling operation of said main valve and biased toward main valve opening position, means normally locking said pilot valve means in inoperative position in which said main valve is closed, means for releasing said locking means, means disposed to limit the operable movement of said pilot valve to arrest the opening movement of said main valve and maintain said main valve in a position intermediate its extremes of travel, means for altering the arrangement of said limiting means to remove its arresting action to permit said pilot valve to control movement of said main valve beween full open and completely closed positions, and means for activating said locking means whereupon said main valve is moved to closed position.

16. In a flow control device, a main valve, pilot valve means controlling operation of said main valve and biased toward main valve open position, means for curtailing the operative movement of said pilot valve during the opening of said main valve, pressure regulating means operating through said pilot valve means modifying operation of said pilot valve means, and means for locking said pilot valve means in a main valve closed position preventing operation of said regulating means therethrough.

17. In a flow control apparatus, a main valve, means biased toward main valve open position for controlling operation of said main valve, means including a movable element which when in one position functions to limit the operable movement of said first means and when in another position permits full operable movement of said first means, heat responsive means for moving said element to said second named position, and pressure responsive means operable through said first means in conjunction with said movable element for controlling the flow of fluid through the apparatus.

18. In a flow control device, a main valve, pilot valve means biased toward main valve open position for controlling operation of said main valve, means normally locking said pilot valve means in main valve closed position against the bias, means for releasing said locking means, heat responsive means operable to limit initial pilot valve movement and to yieldably control said pilot valve during the further opening movement of said main valve, pressure regulating means controlling the operation of said pilot valve thereafter, said heat responsive means and said pressure regulating means being disposed to control said pilot valve jointly, and means for activating said locking means to lock said pilot valve means whereupon said pressure regulating means and said heat responsive means becomes ineffective.

19. In a flow control device, a main valve, pilot valve means biased toward main valve open position for controlling operation of said main valve through opening and closing movements, heat responsive means controlling the rate of operable movement of said pilot valve in opposition to the pilot valve bias during a portion of the opening movement of said main valve, and pressure regulating means operating through said pilot valve means in conjunction with said heat responsive means for controlling the position of said main valve to govern the flow of fluid through said device.

20. In a flow control device, a main valve, pilot valve means, means biased toward main pilot valve open position for controlling said pilot valve to variably position said main valve, said means including a stop for arresting operable movement of the pilot valve during the first portion of the opening movement of said main valve and means for moving said stop to permit further operable movement of said pilot valve during the second portion of the opening movement of said main valve, and means for locking said pilot valve means in a predetermined main valve closed position.

21. In a flow control device, a main valve, means biased toward main valve opening position controlling opening of said main valve, means including a first two position element which when in one position functions to maintain said first means in inactive main valve closed position and when in its other position releases said first means to function, a second two position element which when in one position functions to limit movement of said first means and when in its other position releases said first means for full operable movement of said first means and means operable in conjunction with said first element for overcoming the first bias to effect closing of said main valve.

22. In a flow control device, a main valve, a pilot valve, a control arm for said pilot valve, means biasing said control arm toward a main valve opening position, power means normally biased to one position wherein it holds said control arm in a main valve closed position, said power means being movable against its bias to a second position wherein said control arm is permitted to move to a main valve open position, and pressure responsive means positioned to be engaged by said control arm only when said power means is in its second position, said pressure responsive means being operable to vary the position of said control arm in accordance with variations in pressure acting thereon.

23. A flow control device as defined in claim 22 wherein said pressure responsive means has separate means for normally biasing it out of engagement with said control arm.

DANIEL G. TAYLOR.

REFERENCES CITED

The following references are of record in the file of this patent:

UNITED STATES PATENTS

| Number | Name | Date |
|---|---|---|
| 1,788,925 | McKee | Jan. 13, 1931 |
| 2,158,068 | Grove | May 16, 1939 |
| 2,158,787 | Lorenz | May 16, 1939 |
| 2,247,060 | Levine | June 24, 1941 |
| 2,251,618 | Rogers | Aug. 5, 1941 |
| 2,317,639 | Ray | Apr. 27, 1943 |
| 2,317,640 | Ray | Apr. 27, 1943 |
| 2,362,631 | Harris | Nov. 14, 1944 |

Certificate of Correction

Patent No. 2,461,615. February 15, 1949.

DANIEL G. TAYLOR

It is hereby certified that error appears in the printed specification of the above numbered patent requiring correction as follows:

Column 7, lines 73 and 74, claim 7, for "a position which permits said main valve to open," read *main valve opening position,*;

and that the said Letters Patent should be read with this correction therein that the same may conform to the record of the case in the Patent Office.

Signed and sealed this 12th day of July, A. D. 1949.

[SEAL]

THOMAS F. MURPHY,
*Assistant Commissioner of Patents.*